(12) United States Patent
Eberle et al.

(10) Patent No.: US 7,320,147 B2
(45) Date of Patent: Jan. 22, 2008

(54) LAWN SWEEPER

(75) Inventors: Jon Robert Eberle, Doylestown, PA (US); Jason Matthew Banowetz, Glenside, PA (US)

(73) Assignee: Schiller-Pfeiffer, Inc., Southampton, PA (US)

( * ) Notice: Subject to any disclaimer, the term of this patent is extended or adjusted under 35 U.S.C. 154(b) by 279 days.

(21) Appl. No.: 11/243,681

(22) Filed: Oct. 5, 2005

(65) Prior Publication Data

US 2006/0070194 A1 Apr. 6, 2006

Related U.S. Application Data

(60) Provisional application No. 60/615,865, filed on Oct. 5, 2004.

(51) Int. Cl.
*E01H 1/02* (2006.01)

(52) U.S. Cl. .............................. 15/79; 15/83

(58) Field of Classification Search ............... None
See application file for complete search history.

(56) References Cited

OTHER PUBLICATIONS

SEARS, Craftsman 46 in. Lawn Sweeper with Dethatcher; http://www.sears.com; 1 page, (Jul. 14, 2004).
SEARS, Craftsman 17 cu. ft., 42 in. High-Speed Sweeper Attachment; http://www.sears.com; 1 page, (Jul. 14, 2004).
SEARS, Craftsman 38 in. Lawn Sweeper; http://www.sears.com, 1 page, (Jul. 14, 2004).
Minuteman Parker, Lawn Sweepers; http://www.minutemanintl.com, 3 pages, (Jul. 14, 2004).
Cool Things, Lawn Sweeper; http://www.kshs.org, 1 page, (Jul. 14, 2004).

*Primary Examiner*—David Redding
(74) *Attorney, Agent, or Firm*—Akin Gump Strauss Hauer & Feld LLP (57) ABSTRACT

A lawn sweeper for collecting debris from a surface includes a frame. At least one wheel is rotatable with respect to the frame for movement of the lawn sweeper along the surface. A collection bin is engaged with the frame for collecting the debris. A brush assembly has at least one brush for urging the debris from the surface into the collection bin. A reducing mechanism reduces a volume of the debris within the collection bin.

8 Claims, 6 Drawing Sheets

LAWN SWEEPER

CROSS-REFERENCE TO RELATED APPLICATIONS

This patent application claims priority to U.S. Provisional Patent Application No. 60/615,865, filed Oct. 5, 2004, entitled "Lawn Sweeper", the disclosure of which is incorporated herein by reference.

BACKGROUND OF THE INVENTION

This invention generally relates to lawn sweepers and, more particularly, to lawn sweepers with motor-driven brush assemblies and reducing mechanisms.

Lawn sweepers are generally well known and typically have a tubular frame and a durable fabric or vinyl bag attached thereto. At least two wheels are disposed proximate the front of the conventional lawn sweeper and are used to drive a brush assembly, also proximate the front of the lawn sweeper, through either gearing or a belt and pulley combination. Although having the brush assembly driven by the wheels is a more common configuration, it is also generally known to drive the brush assembly using an electric motor. Conventional lawn sweepers are either of the push-behind variety, where a user manually pushes the lawn sweeper around the area to be swept, or the trail-behind variety, where a user hitches the lawn sweeper to the back of a tractor, all terrain vehicle, or other such vehicle, pulling the lawn sweeper behind the vehicle to sweep an area.

A typical problem confronting the user of a conventional lawn sweeper is that the bag tends to fill up quickly, especially when sweeping up dried leaves and other such debris that piles loosely with a large amount of free space within the pile. It would therefore be desirable to have a lawn sweeper with a reducing mechanism within the bag or collection container that would reduce the volume of the debris collected by removing at least some of the empty open space within the pile to allow the debris to pile more densely. In this way, such a reducing mechanism would allow more debris to be collected before emptying the bag or collection container.

BRIEF SUMMARY OF THE INVENTION

Briefly stated, the present invention is a lawn sweeper for collecting debris from a surface comprising a frame. At least one wheel is rotatable with respect to the frame for movement of the lawn sweeper along the surface. A collection bin is engaged with the frame for collecting the debris. A brush assembly has at least one brush for urging the debris from the surface into the collection bin. A reducing mechanism reduces a volume of the debris within the collection bin.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Referring to the drawings in detail, wherein like numerals indicate like elements throughout, there is shown in FIGS. 1-6 a preferred embodiment of a lawn sweeper, indicated generally at 10, for collecting debris 90 from a surface 80 in accordance with the present invention. The lawn sweeper 10 includes a reducing mechanism 30 and a brush assembly 40, at least one of which, and preferably both are preferably driven by a motor 18, as will be described in more detail below.

Referring to FIGS. 1, 2, 5, and 6, the lawn sweeper 10 includes a frame 11, with which a collection bin 16 is preferably engaged for collecting the debris 90 swept up from the surface 80 by the lawn sweeper 10. Preferably, the frame 11 has side tubes 15 to which top sides of the collection bin 16 are attached. The frame 11 is preferably constructed of a relatively lightweight, but durable, material, such as tubular steel or aluminum, for instance. While this is preferred, it is contemplated that the frame 11 be made of a different material, provided the frame 11 is still capable of functioning as described herein. Preferably, the frame 11 forms a handle 14 extending rearwardly from a top rear side of the collection bin 16, such that the handle 14 is at a height and angle to enable a user to relatively easily steer or guide the lawn sweeper 10 along the surface 80.

Preferably, the handle 14 is continuously formed as part of the side tubes 15 of the frame 11 that extends along the top angled sides of the collection bin 16 bending downwardly proximate the front of the collection bin 16 to generally outline the shape of the top and front of the collection bin 16. The side tubes 15 then preferably extend downwardly from the bottom of the collection bin 16, curling under to form supports 24 to support the collection bin 16 above the surface 80 so that the bottom of the collection bin 16 does not scrape along the surface 80 during use or contact the surface 80 when stationary. Although this configuration is preferred, it is within the spirit and scope of the present invention that the side tubes 15 could be eliminated such that the handle 14 and the supports 24 are fixed to and extend outwardly from the collection bin 16.

Preferably, the collection bin 16 is essentially a box-like structure having a generally flat, horizontal bottom, an open front end, a closed back, right and left sides increasing in height from the front of the lawn sweeper to the back, and an open top. In this way, when viewed from either side, the collection bin 16 is trapezoidal in shape. Along a forward edge of the bottom of the collection bin 16 is a front lip 16*a* that angles slightly upwardly from the generally horizontal bottom. Although this shape is preferred, it is within the spirit and scope of the present invention that the collection bin 16 have a different shape, provided the collection bin 16 is still capable of performing as described herein. For instance, the collection bin 16 could be in the shape of a rectangular prism, cube, or other such shape, or, alternatively, the collection bin 16 could have rounded corners and/or curved sides.

The collection bin 16 can be constructed out of any appropriate material or combination of materials. For instance, the collection bin 16 can be constructed with a molded plastic, generally rigid bottom and vinyl or durable fabric sides extending upwardly therefrom to generally form the shape of the collection bin 16 described above. By having vinyl or fabric side walls, the collection bin 16 can be folded in order to decrease the overall size of the lawn sweeper 10 for storage, transportation, or any such activity in which it would be advantageous for the lawn sweeper 10 to have a smaller profile. It is further contemplated that the collection bin 16 be constructed differently using different materials, provided the lawn sweeper 10 is still capable of performing as described herein. For instance, the collection bin could be formed entirely out of a polymeric material, such that the entire collection bin is rigid, or the collection bin could be formed entirely out of vinyl or durable fabric. It is further contemplated that the collection bin be made from other materials, such as metal and/or wood, for instance.

A front housing 22 is preferably also engaged with the frame or, alternatively, the collection bin 16 and is disposed at the front end of the collection bin 16. The front housing 22 has at least one wheel 12 rotatably attached therewith so that the at least one wheel 12 is rotatable with respect to the frame 12 for movement of the lawn sweeper 10 along the surface 80. Preferably, the lawn sweeper 10 includes two wheels 12 with one wheel 12 at either side of the front housing 22.

Figure 2:
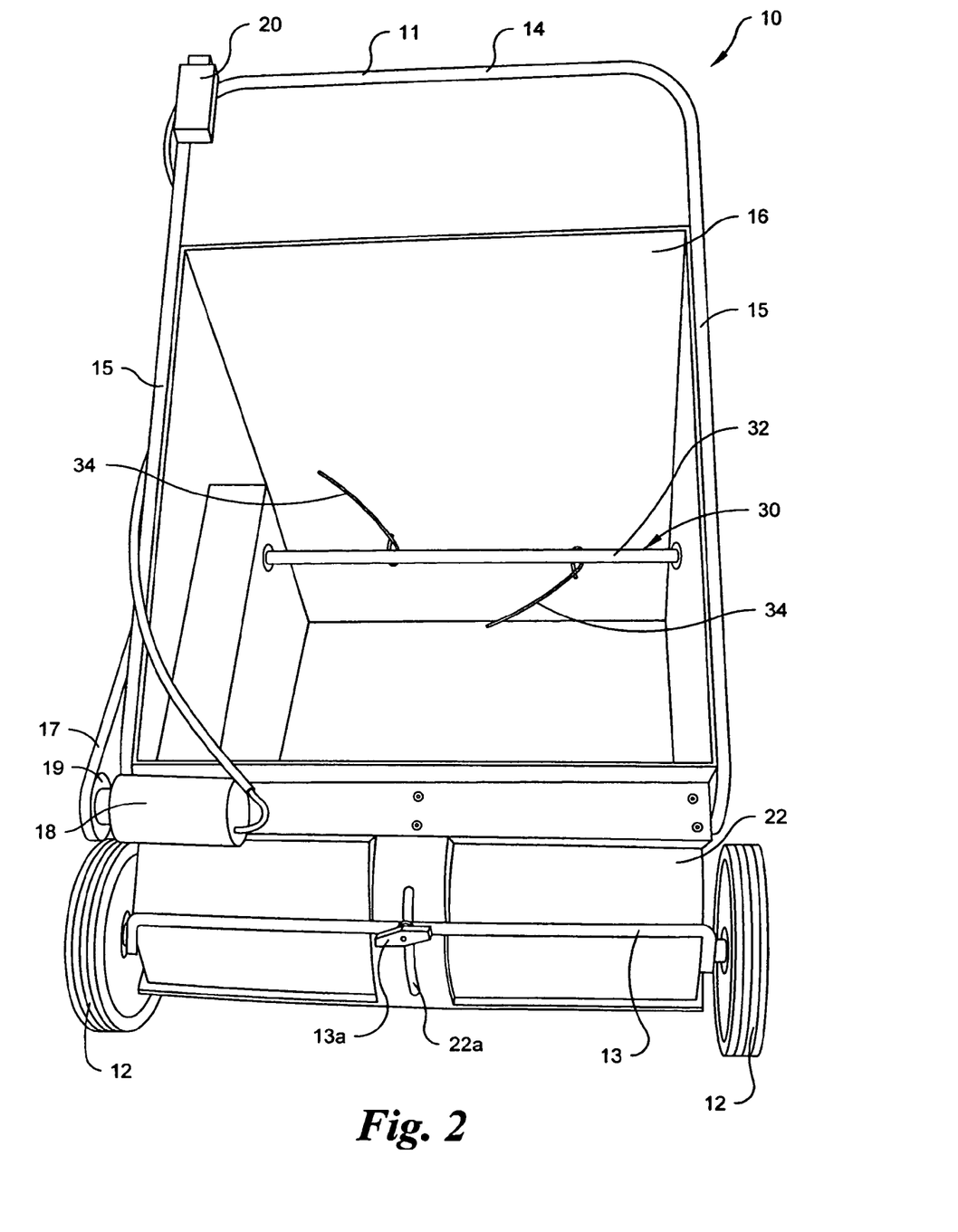
FIG. 2 is a top front perspective view of the lawn sweeper of FIG. 1.
Figure 3:
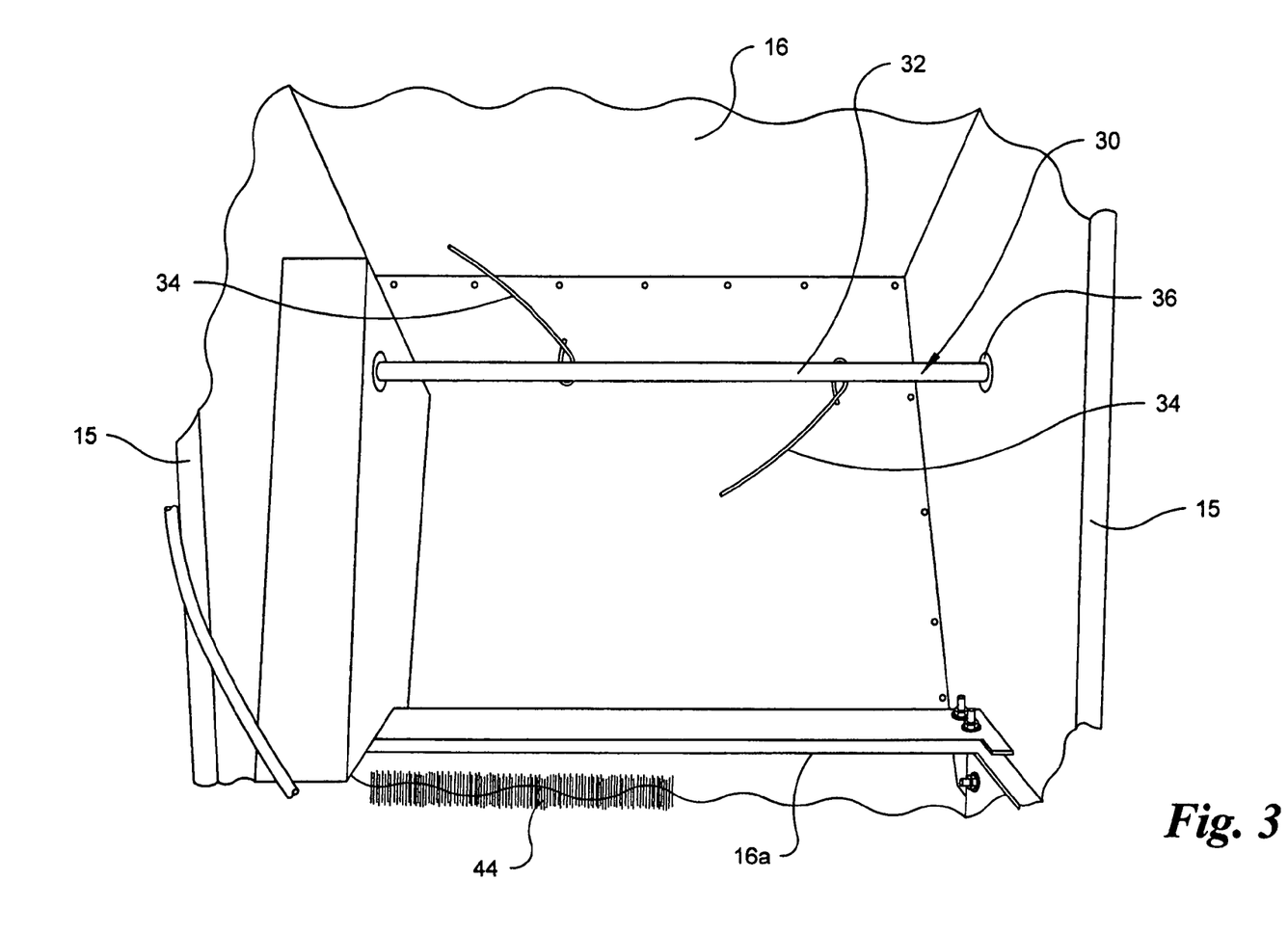
FIG. 3 is an enlarged top partial perspective view of a reducing mechanism within a collection bin of the lawn sweeper of FIG. 1.
Figure 5:
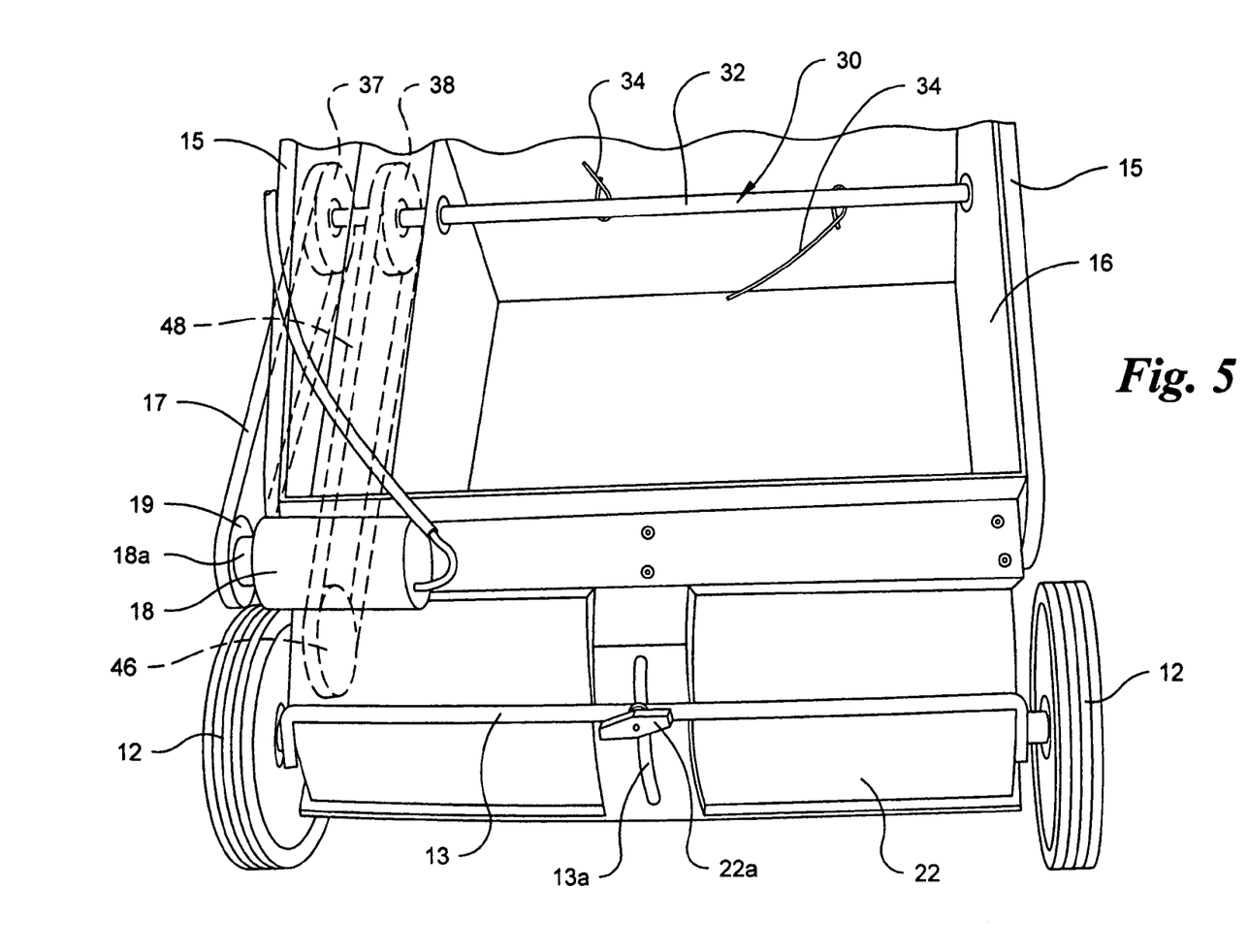
FIG. 5 is an enlarged top front partial perspective view of the lawn sweeper of FIG. 1.

Referring specifically to FIGS. 2 and 5, preferably, the wheels 12 are adjustable in order to vary a spacing between a bottom of the front housing 22 and the surface 80. Such adjustable wheels 12 are preferably achieved by mounting the wheels 12 to a U-shaped bar 13 that is pivotably attached at its ends to the front housing 22. Due to the placement of the wheels 12 on the bar 13 (generally spaced from the attachment points of the bar 13 to the front housing 22), rotation of the bar 13 varies vertical orientation (i.e., wheel height) of the wheels 12 with respect to the front housing 22 in order to lift or lower the front housing 22, thereby varying the spacing between the front housing 22 and the surface 80. The adjustment bar 13 can be maintained at a particular setting by tightening an adjustment bolt 13*a*, which can be disposed at any point (preferably the center) along the adjustment bar 13. The adjustment bolt 13*a* extends through the adjustment bar 13 and into a slot 22*a* within the front housing 22. The adjustment bolt 13*a* can be loosened to allow the adjustment bolt 13*a* to slide within the slot 22*a* in order to pivot the adjustment bar 13 and vary the height of the wheels 12. Once a desired height is achieved, the adjustment bolt 13*a* is tightened to maintain the desired height of the wheels 12. Because each of the wheels 12 is attached to the same adjustment bar 13, a particular wheel height may be selected and both wheels 12 can be set at that wheel height simultaneously.

Referring now to FIGS. 1, 2, 5, and 6, the motor 18 is preferably disposed at the top of the front housing 22. Preferably, the motor 18 is electrically powered and uses electricity from an electrical outlet (not shown). The lawn sweeper 10 preferably has an electrical plug (not shown) that is able to be plugged into the electrical outlet or an extension cord (not shown) extending therefrom. Alternatively, instead of using electricity from an electrical outlet, it is contemplated that the lawn sweeper 10 use electricity from an onboard battery (not shown), either rechargeable or non-rechargeable, to power the motor 18. Although it is preferable that the motor 18 be electrically powered, it is within the spirit and scope of the present invention that the motor 18 have a different power source, such as gasoline, natural gas, or the like. The motor 18 is preferably turned on and off by the user using a control 20 disposed on the handle 14. The control 20 is preferably a toggle switch, toggling between an off position and an on position. The motor 18 is preferably a one speed motor, although it is within the spirit and scope of the present invention that the speed of the motor 18 be able to be controlled in order to speed up or slow down the operation of the motor 18, as desired.

Figure 1:
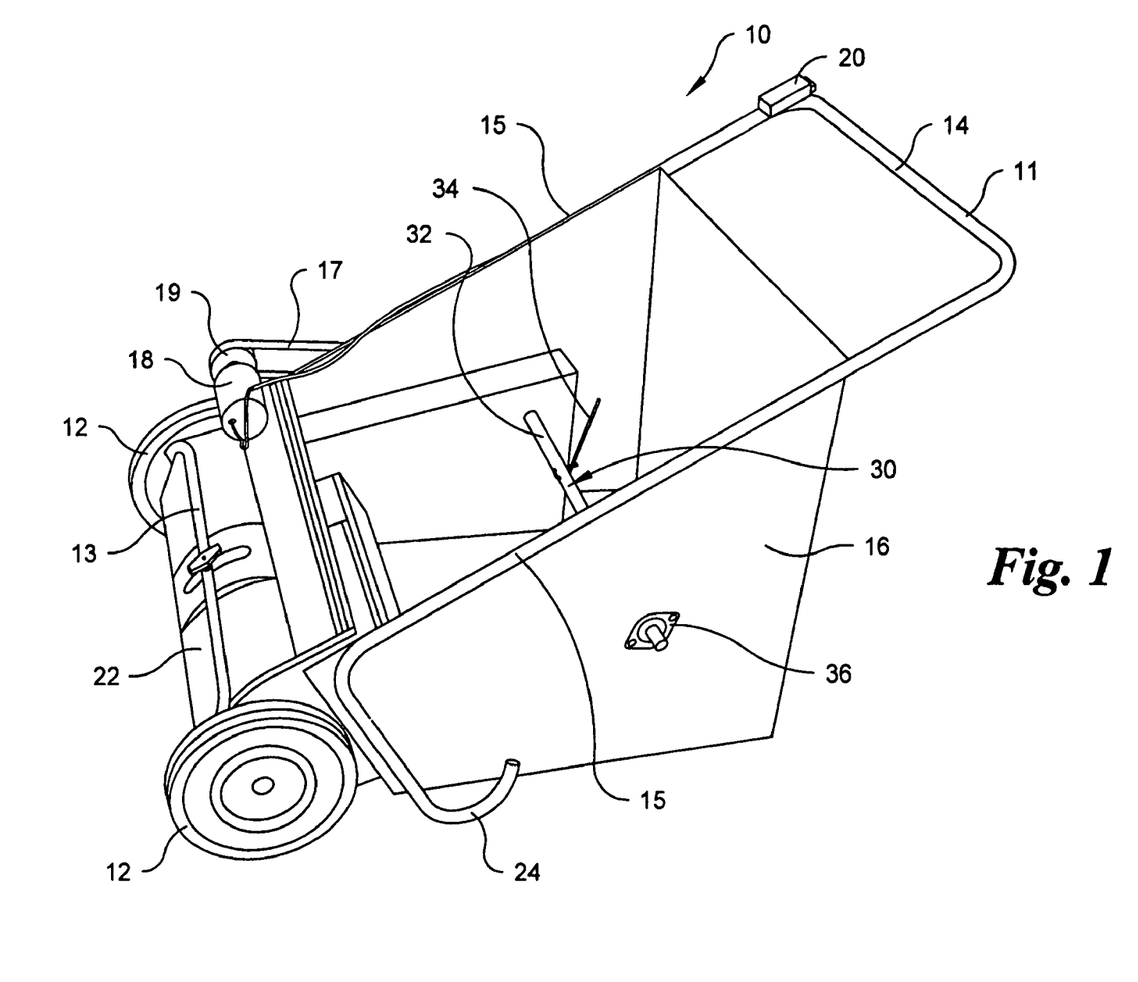
FIG. 1 is a right front perspective view of a lawn sweeper in accordance with a preferred embodiment of the present invention.
Figure 6:
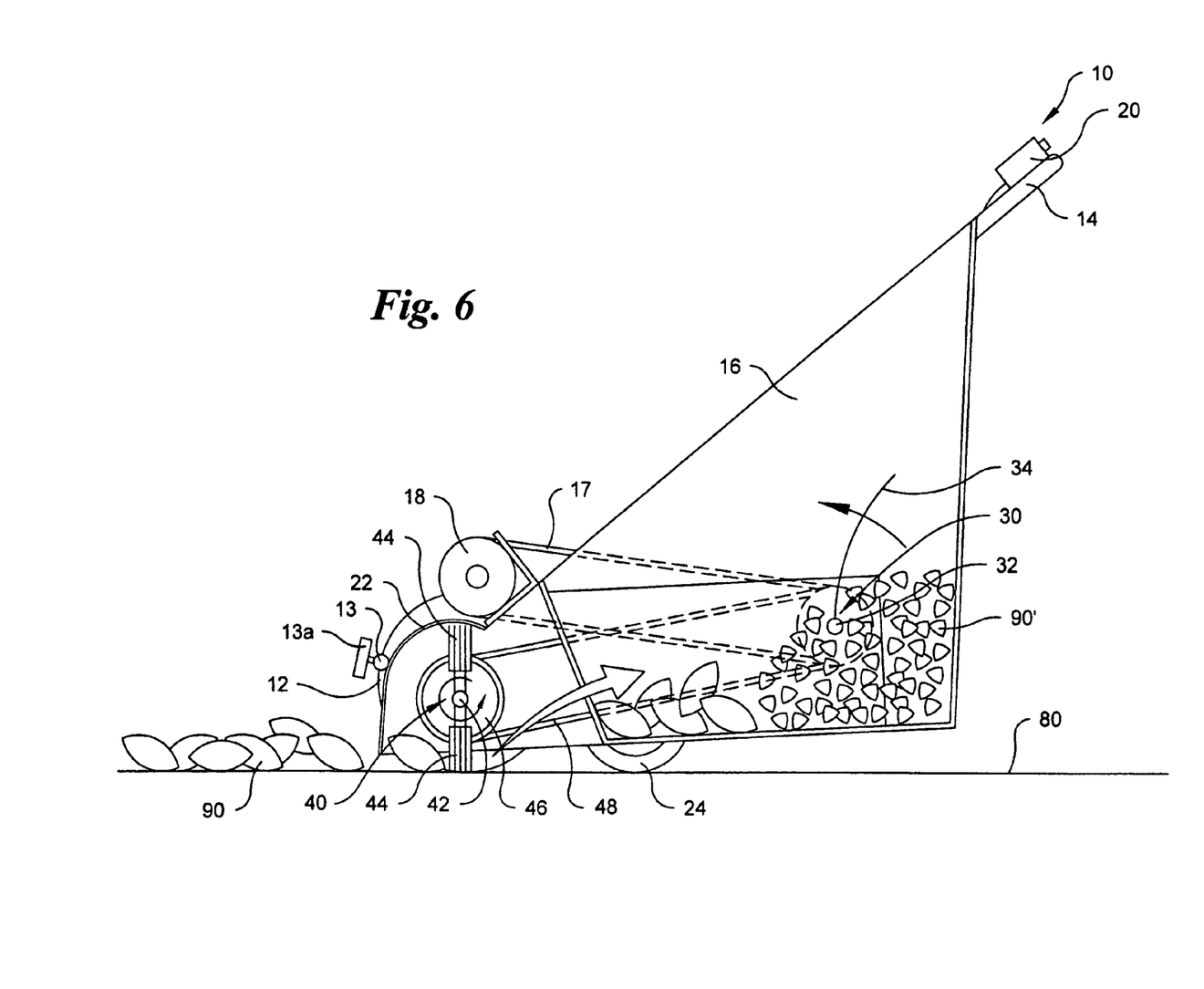
FIG. 6 is a cross-sectional view of the lawn sweeper of FIG. 1 sweeping debris into the collection bin and reducing a volume of the debris using the reducing mechanism.

As stated above, the motor 18 preferably drives at least one of the brush assembly 40 and the reducing mechanism 30 and more preferably drives both. Referring to FIGS. 1, 5, and 6, the motor 18 preferably has an output shaft 18*a* with a motor pulley 19 attached thereto. A first belt 17 is wrapped around the motor pulley 19 and is driven thereby. Preferably, the first belt 17 wraps around and drives a first pulley 37, which is fixed to the shaft 32 of the reducing mechanism 30, thereby driving the reducing mechanism 30. It is preferred that a second pulley 38 is also fixed to the shaft 32 of the reducing mechanism 30. A second belt 48 is preferably wrapped around the second pulley 38 and a brush pulley 46, such that driving of the reducing mechanism 30 also causes a brush shaft 42 to rotate, thereby also driving the brush assembly 40.

While this is the preferred configuration, it is within the spirit and scope of the present invention that the motor 18 drive the brush assembly 40 and the reducing mechanism 30 in a different manner from that described above. For instance, the motor 18 could have two pulleys attached to the output shaft 18*a*, one pulley having a belt to directly drive the reducing mechanism 30 and the other pulley having another belt to directly drive the brush assembly 40. Although it is preferred that a first and second belts 17, 48 drivingly engage the motor 18 to the reducing mechanism 30 and the brush assembly 40, it is within the spirit and scope of the present invention that the motor 18 be connected to the reducing mechanism 30 and the brush assembly 40 through alternate means, such as a chain, gearing, or the like. Furthermore, although it is preferred that the motor 18 drive both the reducing mechanism 30 and the brush assembly 40, it is within the spirit and scope of the present invention that the motor 18 drive only one or none of the reducing mechanism 30 and the brush assembly 40 and that one or both of the reducing mechanism 30 and the brush assembly 40 be driven by rotation of the wheels 12 during manual pushing of the lawn sweeper 10. That is, gearing, chains, belts, or the like could be used to drivingly engage the wheels with one or both of the reducing mechanism 30 and the brush assembly 40 so that rotation of the wheels 12 (during pushing of the lawn sweeper 10, for instance) would cause operation of one or both of the reducing mechanism 30 and the brush assembly 40. Moreover, although it is preferred that the wheels 12 of the lawn sweeper 10 be unpowered to necessitate manual pushing of the lawn sweeper 10, it is within the spirit and scope of the present invention that the wheels 12 be drivingly connected to the motor 18 through gearing, chains, belts, or the like so that actuation of the motor 18 would cause rotation of the wheels 12, thereby making the lawn sweeper 10 self-propelled. Lastly, although disposed on the left side of the top of the front housing 22, it is within the spirit and scope of the present invention that the motor 18 be disposed anywhere on the lawn sweeper 10.

Figure 4:
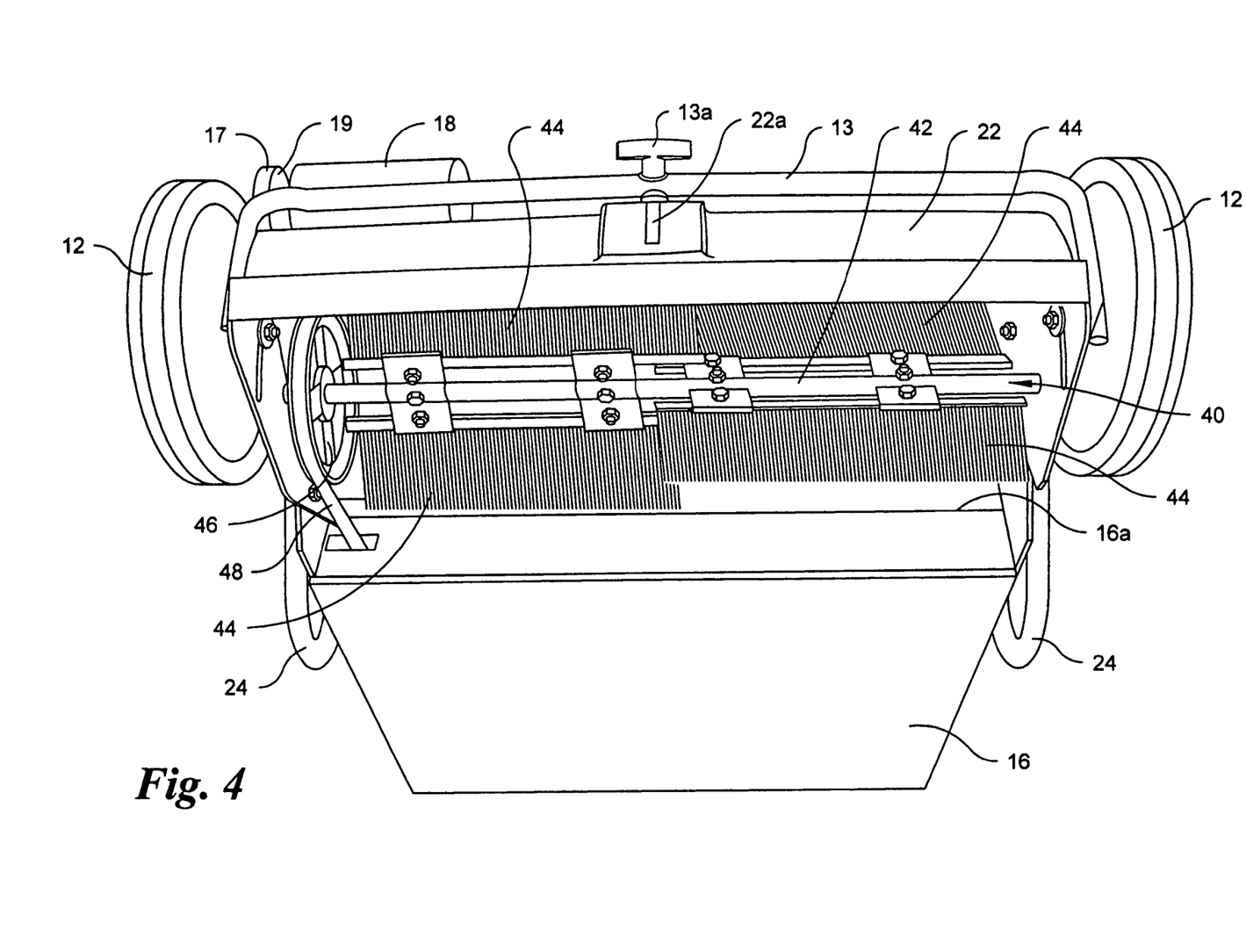
FIG. 4 is a bottom front perspective view of the lawn sweeper of FIG. 1.

Referring now to FIGS. 4 and 6, the brush assembly 40 is preferably disposed at least partially within the front housing 22 and acts to urge the debris 90 from the surface 80, through the front housing 22, and into the collection bin 16. The brush assembly 40 has at least one brush 44 to move the debris 90 from the surface 80 into the collection bin 16. The brush assembly 40 further includes the brush shaft 42 rotatably disposed within the front housing 22. The brush shaft 42 has the brush pulley 46 fixed on one side, preferably the left side, which is driven, preferably as described above, by the motor 18. Preferably, a plurality of brushes 44 is disposed along and extends outwardly from the brush shaft 42. In this way, the brush shaft 42 and the brushes 44 are rotatable with respect to the front housing 22 and the frame 11 in order to urge the debris 90 from the surface 80 into the collection bin 16.

It is preferable that the brush shaft 42 have four brushes 44 extending radially outwardly therefrom, although it is within the spirit and scope of the present invention that there be more or less than four brushes 44. The brushes 44 are preferably oriented such that a pair of brushes 44 is disposed on either side of the brush shaft 42. The brushes 44 of each pair are diametrically opposed from one another with one pair of brushes 44 being offset by 90° from the other pair of brushes 44. Although this configuration is preferred, it is within the spirit and scope of the present invention that there be more or less than four brushes 44 or that the brushes 44 be oriented differently along the brush shaft 42. Preferably, the brushes 44 extend outwardly from the brush shaft 42 sufficiently to enable the brushes 44 to come into contact with the surface 80 on which the lawn sweeper 10 is pushed to enable the brushes 44 to sweep the debris 90 from the surface and into the collection bin 16.

Referring to FIGS. 1-3 and 6, the reducing mechanism 30 acts to reduce a volume of the collected debris 90 within the collection bin 16 to enable more debris 90 to fit within the collection bin 16 before emptying of the collection bin 16 is necessary. Preferably, the reducing mechanism 30 is disposed at least partially within the collection bin 16, although it is within the spirit and scope of the present invention that the reducing mechanism 30 be located at any point within the path of the debris 90 from the surface 80 to the collection bin 16, such as, but not limited to within the front housing 22. However, it is preferred that the reducing mechanism 30 be located within the collection bin 16, preferably proximate the back thereof.

The reducing mechanism 30 includes a shaft 32, preferably extending between the left and right sides of the collection bin 16, the shaft 32 being rotatable with respect to the collection bin 16 within bearings 36 disposed within either side of the collection bin 16. As stated above, the first pulley 37 is preferably engaged to an end of the shaft 32 for engagement with the first belt 17 to drivingly connect the shaft 32 with the motor 18. At least one trimming cord 34 extends from and is rotatable with the shaft 32. The trimming cord 34 preferably functions to cut the debris 90 within the collection bin 16 into chopped debris 90' in order to reduce a volume of free space within the collection bin 16. Preferably, a plurality of trimming cords 34 extending outwardly from and rotate with the shaft 32. The trimming cords 34 are preferably made of nylon, although it is contemplated that other materials could be used for the trimming cords 34, such as other polymeric materials or metal, for instance. It is preferable that the lengths of the trimming cords 34 be able to be adjusted manually by the user, although it is within the spirit and scope of the present invention that the lengths of the trimming cords 34 be automatically adjusted using an automated mechanism (not shown) within the lawn sweeper 10. Preferably, the trimming cords 34 are replaceable to allow the user to replace the trimming cords 34 as they wear, break, or otherwise become ineffective. Although two trimming cords 34 are portrayed, it is within the spirit and scope of the present invention that there be more or less than two trimming cords 34 extending from the shaft 32. In this way, operation of the motor 18 causes rotation of the shaft 32 and, consequently, the trimming cords 34, within the collection bin 16 in order to chop debris 90 collected within the collection bin 16 into smaller pieces 90'. Additionally, although the shaft 32 of the reducing mechanism 30 preferably extends between the left and right sides of the collection bin 16, it is within the spirit and scope of the present invention that the shaft 32 of the reducing mechanism 30 be oriented differently, provided the reducing mechanism 30 is still capable of functioning to reduce a volume of the collected debris 90 within the collection bin 16. For instance, it is contemplated that the shaft 32 of the reducing mechanism 30 extend between the front and back sides of the collection bin 16, extend vertically within the collection bin 16 from the bottom thereof, or extend in a diagonal direction across the collection bin 16.

In use, the user turns on the lawn sweeper 10, specifically, the motor 18, using the control 20. Doing so preferably starts rotation of the reducing mechanism 30 and the brush assembly 40. The user then pushes the lawn sweeper 10 along the surface 80 having debris 90 thereon. Depending on whether the surface 80 has tall, short, or no grass thereon, the height of the wheels 12 should be adjusted accordingly using the adjustment bar 13 and the adjustment bolt 13a. As the lawn sweeper 10 is pushed over the debris 90, the rotating brushes 44 sweep the debris 90 rearwardly over the front lip 16a and into the collection bin 16. The debris 90 collected within the collection bin 16 coming into contact with the reducing mechanism 30 is then chopped into smaller pieces 90' by the reducing mechanism 30. Specifically, the trimming cords 34 rotate with the shaft 32 to chop the debris 90 into smaller pieces 90' in a manner similar to a conventional line trimmer. When the collection bin 16 is sufficiently full of debris 90, 90', the user can empty the debris 90, 90' from the collection bin 16 and then resume operation of the lawn sweeper 10 if further sweeping is necessary. Although it is preferred that the lawn sweeper 10 be manually pushed by the user during operation, alternatively, it is within the spirit and scope of the present invention that the lawn sweeper 10 be able to be attached to and pulled, pushed, or otherwise moved by a lawn tractor, all terrain vehicle, or other such vehicle during operation, if desired, or that the wheels 12 be propelled by the motor 18, thereby making the lawn sweeper 10 self-propelled.

In this way, the lawn sweeper 10 of the present invention provides a light, easy-to-use device for picking up debris 90 from a surface 80. Also, the reducing mechanism 30 allows the lawn sweeper 10 to collect a greater amount of debris 90, 90' before the user is required to empty the collection bin 16. That is, by chopping the debris 90 into smaller pieces 90', it is possible to reduce the volume of free space within a pile of the debris 90, thereby compressing the volume of the debris 90, 90' within the collection bin 16 and allowing a greater amount of debris 90 to be collected by the lawn sweeper 10 before requiring the user to empty the collection bin 16.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

We claim:

1. A lawn sweeper for collecting debris from a surface, comprising:
    a frame;
    at least one wheel rotatable with respect to the frame for movement of the lawn sweeper along the surface;
    a collection bin engaged with the frame for collecting the debris;
    a brush assembly having at least one brush for urging the debris from the surface into the collection bin;
    a reducing mechanism including a shaft rotatable with respect to the collection bin and at least one cord extending from and rotatable with the shaft, that at least one cord cutting the debris within the collection bin to reduce a volume of collected debris, the reducing mechanism being disposed at least partially within the collection bin.

2. The lawn sweeper of claim 1, further comprising a motor for driving at least one of the brush assembly and the reducing mechanism.

3. The lawn sweeper of claim 2, wherein the motor drives both the brush assembly and the reducing mechanism.

4. The lawn sweeper of claim 3, wherein the motor is electrically powered.

5. The lawn sweeper of claim 1, further comprising a front housing engaged with the frame, the brush assembly being disposed at least partially within the front housing and urging the debris from the surface, through the front housing, and into the collection bin.

6. The lawn sweeper of claim 1, wherein the brush assembly includes a plurality of brushes disposed along a shaft, the shaft and plurality of brushes being rotatable with respect to the frame to urge the debris.

7. The lawn sweeper of claim 6, wherein the brush assembly includes two pairs of diametrically opposed brushes.

8. The lawn sweeper of claim 1, wherein a plurality of cords extend from and rotate with the shaft.

* * * * *